US006053586A

United States Patent [19]

Cook et al.

[11] Patent Number: 6,053,586

[45] Date of Patent: Apr. 25, 2000

[54] COMPUTER ACCESS PANEL HAVING A BIASED COVER LATCHING MECHANISM AND METHOD

[75] Inventors: Stephen Cook, Georgetown; John Jeffries, Marble Falls; Karl Steffes, Austin, all of Tex.

[73] Assignee: Dell U.S.A., L.P., Round Rock, Tex.

[21] Appl. No.: 08/957,430

[22] Filed: Oct. 24, 1997

[51] Int. Cl.[7] ............................ A47B 47/00; E05B 65/46

[52] U.S. Cl. .................. 312/223.2; 312/263; 312/265.5; 361/683; 361/724; 292/175; 292/146

[58] Field of Search ............................ 312/223.2, 223.3, 312/263, 264, 257.1, 265.5, 265.6; 361/683, 724, 725, 726; 403/326, 329; 292/162, 175, 146

[56] References Cited

U.S. PATENT DOCUMENTS

| | | | |
|---|---|---|---|
| 3,814,491 | 6/1974 | Kackley | 312/257.1 |
| 4,103,981 | 8/1978 | Donahue et al. | 312/265.6 |
| 4,534,472 | 8/1985 | Hanseler et al. | 403/329 X |
| 4,759,466 | 7/1988 | Chase et al. | 312/223.2 X |
| 4,909,579 | 3/1990 | Liu | 312/223.2 |
| 5,121,951 | 6/1992 | Harbom et al. | 292/175 |
| 5,147,099 | 9/1992 | McLinden et al. | 292/175 |
| 5,164,886 | 11/1992 | Chang | 312/257.1 X |
| 5,360,263 | 11/1994 | Nakano et al. | 312/263 X |
| 5,397,176 | 3/1995 | Allen et al. . | |
| 5,593,219 | 1/1997 | Ho | 312/263 |
| 5,623,391 | 4/1997 | Chase et al. | 361/683 X |
| 5,743,606 | 4/1998 | Scholder | 312/223.2 |
| 5,761,045 | 6/1998 | Olson et al. | 361/724 X |
| 5,825,626 | 10/1998 | Hulick et al. | 312/265.6 X |
| 5,852,739 | 12/1998 | Radloff et al. | 361/683 X |
| 5,997,115 | 12/1999 | Radloff et al. | 312/223.2 X |

*Primary Examiner*—Peter M. Cuomo
*Assistant Examiner*—Hanh V. Tran
*Attorney, Agent, or Firm*—Haynes & Boone, L.L.P.

[57] ABSTRACT

A computer system includes a chassis having a biased slider device mounted thereon. The slider device includes a plurality of connectors positioned in openings in the chassis. When the slider is in a first position, the connectors are positioned in the openings. The slider is movable to a second position removing the connectors from the openings. A cover is releasably mounted on the chassis so that cover interlock members insert into the openings engaging the connectors in the first position and disengaging from the connectors in the second position.

6 Claims, 6 Drawing Sheets

COMPUTER ACCESS PANEL HAVING A BIASED COVER LATCHING MECHANISM AND METHOD

BACKGROUND

The disclosures herein relate generally to a computer chassis and more particularly to an access panel attached to the chassis and including a biased slider release mechanism for unlatching the panel from the chassis.

A typical computer enclosure is usually made up of a chassis, one or more covers, and a bezel, which is the front cosmetic cover of the computer system. There are many combinations of these elements in current computer hardware components. In any enclosure, the ease with which the covers and the bezel can be assembled and removed are important for manufacturability, serviceability and customer satisfaction.

Many computers have covers and bezels which are fastened in place with hardware such as screws. An immediate advantage can be gained by using integral snaps which are easily engaged and released. The main benefit is that a tool is not needed to gain access to the internal components or bays of the computer. There are many computer housings which utilize snaps and hooks in the bezel and covers to provide these added benefits. However, not every enclosure can be easily outfitted with such devices. Due to a variety of issues with how the covers and bezel must be assembled or removed from the system and how the components must be integrated with the chassis, the possibility of adding snap-on/snap-off functionality is limited.

In accordance with one attempted solution to the above-mentioned problem, a tower unit housing for a computer system has been provided including a rectangular box-like chassis which receives a front bezel, an L-shaped hood to cover the top and one side of the chassis and a side member to cover the other side of the chassis. Another enclosure includes a sheet-metal chassis, two cosmetic cover panels and a separate front panel. Each cover panel covers half of the chassis top and one of the sides. The bezel covers the front of the chassis and has openings for the accessible drive bays as well as buttons for interfacing with the computer control panel. To save shipping costs and reduce the time and cost of assembly in the manufacturing process, the right side cover of the chassis is designed to be shipped as part of an assembly with the chassis. The fixed nature of the right side cover, combined with some of the internal bracketry of the chassis, create accessibility problems to many points in the chassis. A problem commonly associated with such cover panels is that they are usually attached to the chassis at multiple latch points which are activated for release by multiple release devices.

Therefore, what is needed is a computer chassis including an access panel engageable with a biased cover latching slider mechanism attaching the panel to the chassis, and a one-button release device operably connected to release the cover from the slider mechanism.

SUMMARY

One embodiment, accordingly, provides an apparatus and method whereby a biased slider mechanism which engages a panel at multiple interlock positions releases the panel by moving the slider with pressure applied at a one-button release device. To this end, a computer system includes a slider device adapted to be mounted on a computer chassis. The slider device has a plurality of connectors thereon and movable therewith. The connectors are spaced apart along an edge of the slider device. An engagement member is on an end of the slider device for engaging a resilient release device attached to the chassis.

A principal advantage of this embodiment is that a cover can be mounted on the chassis and snapped into a retained position engaged with the biased slider mechanism. A one-button release device moves the slider out of engagement with the connectors on the cover.

DETAILED DESCRIPTION OF THE PREFERRED EMBODIMENT

Figure 1:
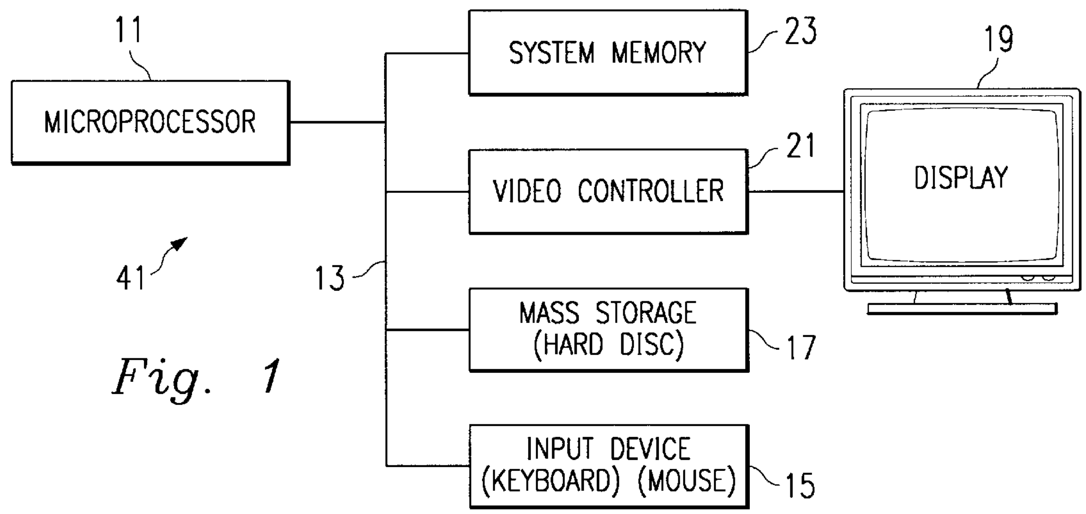
FIG. 1 is a diagrammatic view illustrating an embodiment of a computer system.

In one embodiment, computer system 41, FIG. 1, includes a microprocessor 11 which is connected to a bus 13. Bus 13 serves as a connection between microprocessor 11 and other components of computer system 41. An input device 15 is coupled to microprocessor 11 to provide input to microprocessor 11. Examples of input devices include keyboards, touchscreens, and pointing devices such as mouses, trackballs and trackpads. Programs and data are stored on a mass storage device 17 which is coupled to microprocessor 11. Mass storage devices include such devices as hard disks, optical disks, magneto-optical drives, floppy drives and the like. Computer system 41 further includes a display 19 which is coupled to microprocessor 11 by a video controller 21. A system memory 23 is coupled to microprocessor 11 to provide the microprocessor with fast storage to facilitate execution of computer programs by microprocessor 11. It should be understood that other busses and intermediate circuits can be deployed between the components described above and microprocessor 11 to facilitate interconnection between the components and the microprocessor.

Figure 3:
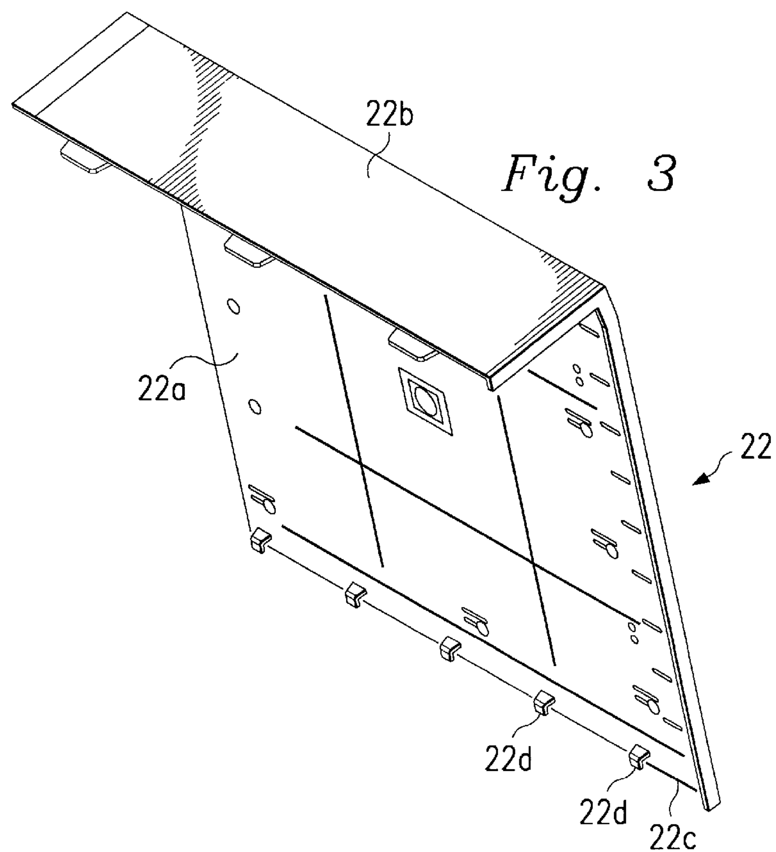
FIG. 3 is an isometric view illustrating an embodiment of a chassis side and top cover.
Figure 2:
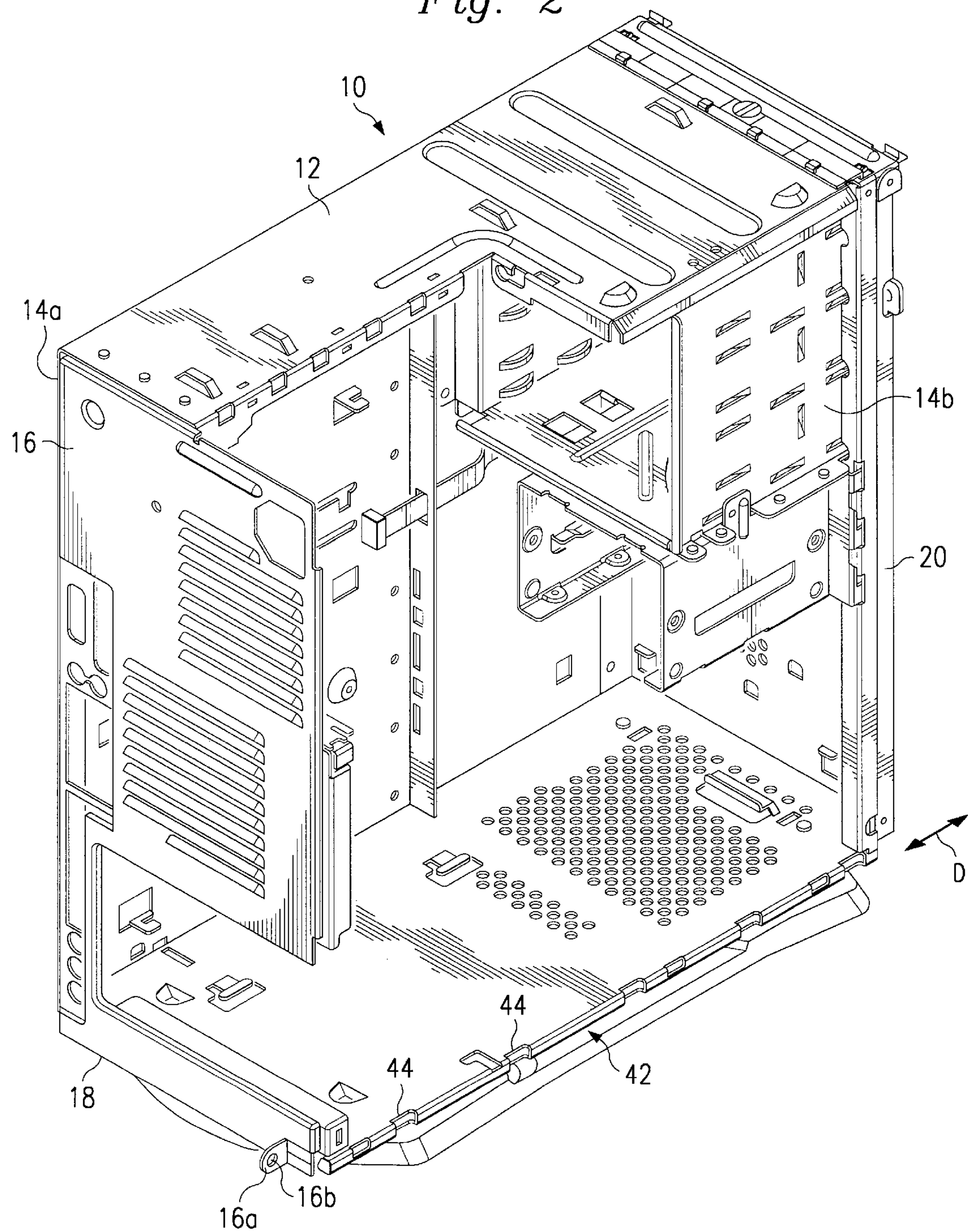
FIG. 2 is an isometric view illustrating an embodiment of a computer chassis.

A computer chassis 10, FIG. 2, of the type typically used to store system components including mass storage device 17, FIG. 1, comprises a substantially rectangular framework formed of plates of stamped metal such as steel. Chassis 10, FIG. 2, generally comprises a top plate 12, a pair of opposed side plates 14*a*, 14*b*, a rear plate 16, including a stationary lock tab 16*a*, having an aperture 16*b* formed therethrough, a bottom plate 18 and a front plate 20. Side plates 14*a*, 14*b* and top plate 12 are usually covered by two chassis covers which are typically formed of a suitable plastic or steel. Commonly, one or both chassis covers used to cover side plates 14*a*, 14*b* are "L" shaped so that a portion of the cover also covers top plate 12. As an example, an "L" shaped cover 22, FIG. 3 includes a full side panel 22*a* and a top panel 22*b*. Top panel 22*b* may cover all of top plate 12 or part thereof.

Figure 4:
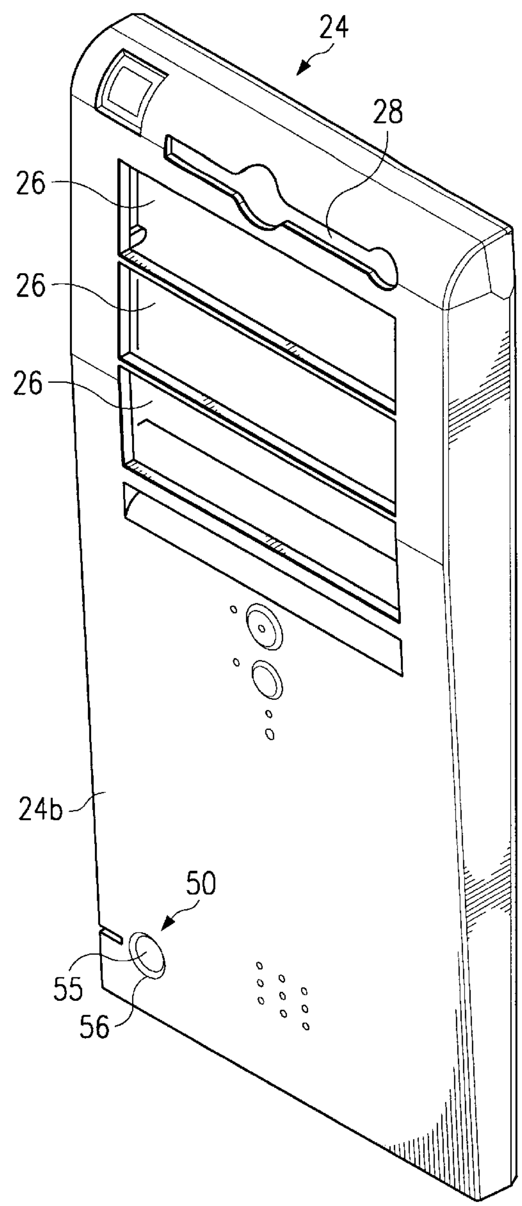
FIG. 4 is an isometric view illustrating an embodiment of a front surface of a bezel.

In the instances where top panel 22*b* covers part of top plate 12, another similar "L" shaped cover provides a full side panel and a supplementary top panel. In the instances where the top panel covers all of top plate 12, another cover is used to only cover the opposite side. An edge 22*c* of cover 22 includes a plurality of protruding hooks 22*d*, substantially equally spaced apart. Front plate 20 is covered by a cosmetic bezel cover 24, FIG. 4, which is selectively contoured and includes access openings such as drive bays 26 and a disc slot 28, for example.

Figure 5:
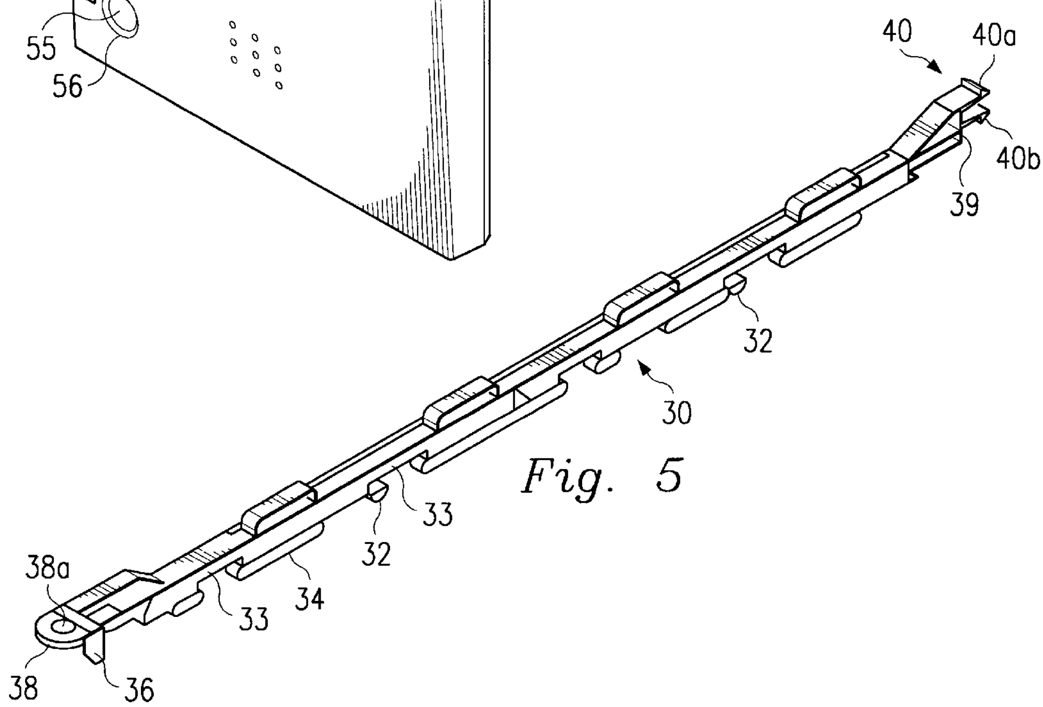
FIG. 5 is an isometric view illustrating an embodiment of a slider interlock mechanism for releasably retaining the side cover.

For the purpose of quickly and easily attaching cover 22 to chassis 10, a biased cover latching slider mechanism 30, FIG. 5, has been provided. Slider 30 is adapted to be movably mounted in chassis 10 and has a plurality of connectors 32 thereon, extending therefrom and movable therewith. Connectors 32 are substantially equally spaced apart in openings 33 formed along an edge 34 of slider 30. A first end 36 of slider 30 includes a movable locking tab 38, including an aperture 38*a* formed therethrough, and a second end 39 of the slider 30 includes an engagement member 40 having flexure members 40*a*, 40*b* for engaging a resilient release device, discussed later.

Figure 5A:
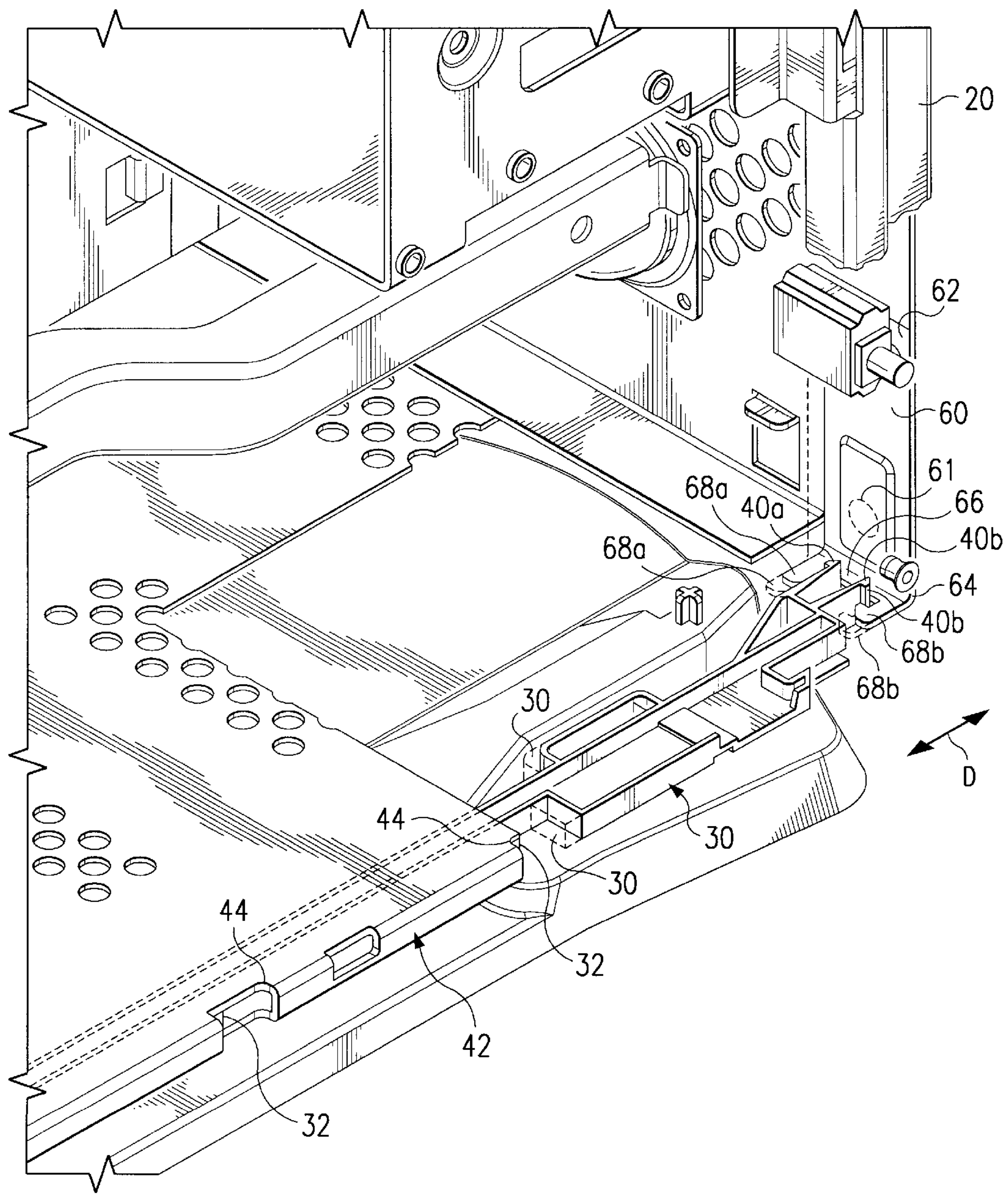
FIG. 5*a* is a partial isometric view illustrating an embodiment of the slider mounted in the chassis.
Figure 6:
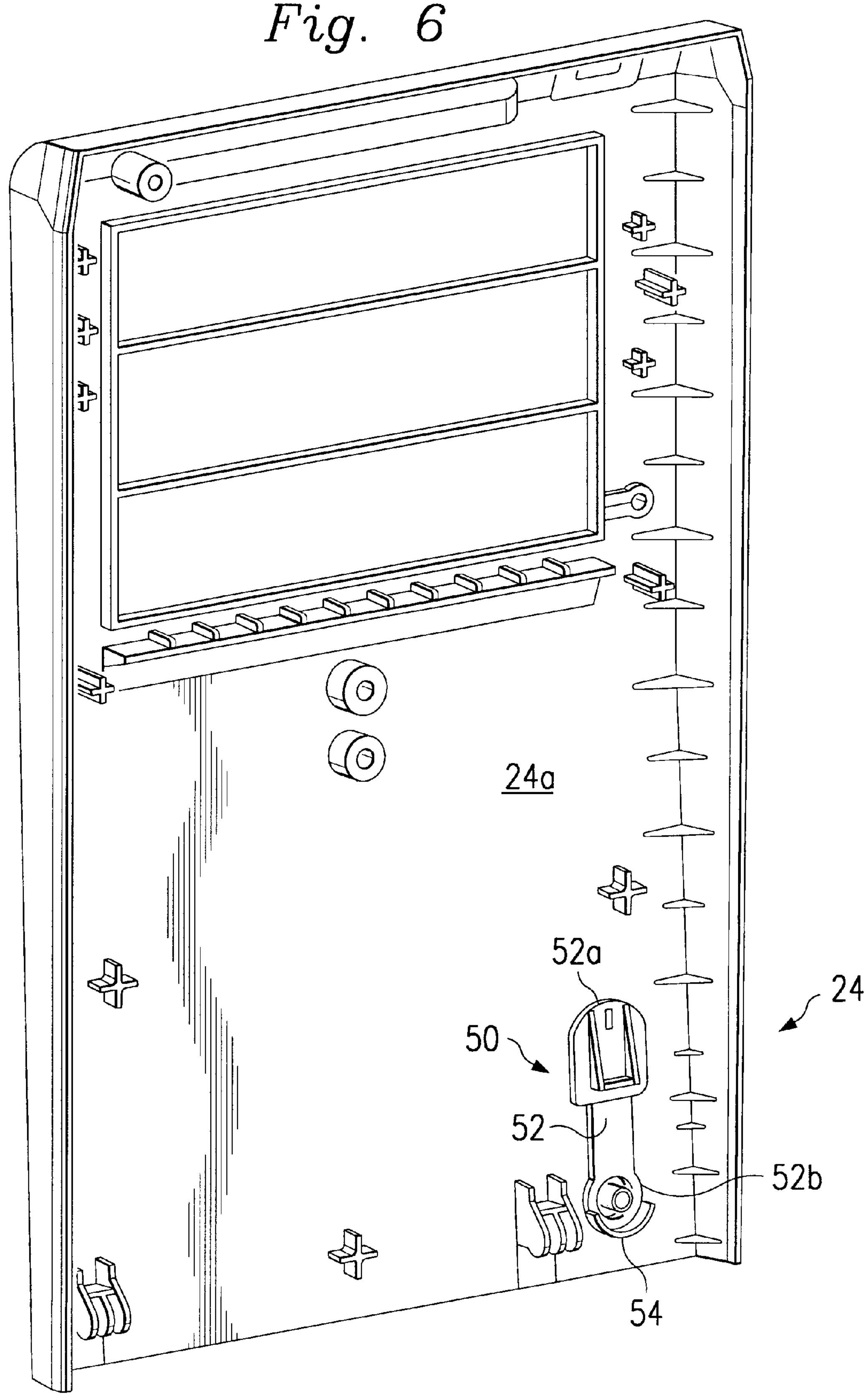
FIG. 6 is an isometric view illustrating an embodiment of a back surface of the bezel.
Figure 7:
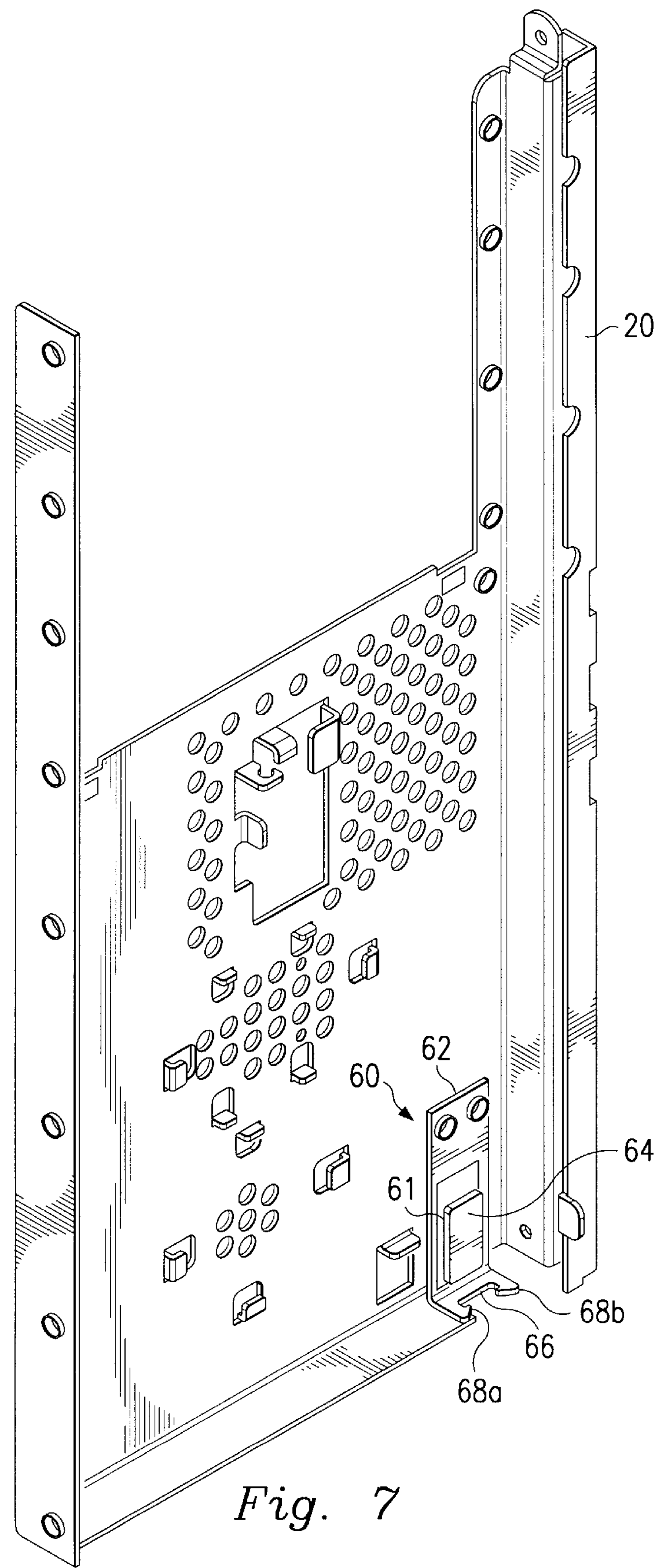
FIG. 7 is an isometric view illustrating an embodiment of the front plate of the chassis.

Slider 30 is provided for mounting in a channel guide 42 in bottom plate 18 of chassis 10, FIG. 2, permitting only reciprocal movement of slider 30 in one axis indicated by a directional arrow designated D, see also FIG. 5*a*. Guide 42 includes openings 44 appropriately spaced apart for exposing connectors 32. The engagement member 40, FIG. 5, is provided to engage the resilient release device, mentioned above, which is illustrated in FIGS. 4 and 6 and generally designated 50. Release device 50 includes a resilient member such as a leaf spring 52, FIG. 6, attached at an end 52*a* to a surface 24*a* of bezel 24. A free end 52*b* of leaf spring 52, including an extension 54, is movable toward and away from surface 24*a*. In a surface 24*b*, FIG. 4, of bezel 24, opposite surface 24*a*, is formed an opening 56 which provides access to expose a button 55 on a portion of free end 52*b* of leaf spring 52. The extension 54 interacts with a return spring 60, FIGS. 5*a* and 7, mounted on front plate 20 of chassis 10. Return spring 60 is provided for engagement with engagement member 40 of slider 30. Return spring 60 includes a resilient leaf spring attached at a first end 62 to front chassis plate 20. A free end 64 is adjacent an opening 61 in front plate 20 and includes a transverse leg 66 and a pair of opposed grooves 68*a*, 68*b* which receive the flexure members 40*a*, 40*b* of slider 30.

In operation, FIGS. 1 to 7 slider 30 is mounted in guide 42 of chassis 10. Flexure members 40*a*, 40*b* of slider 30 are engaged with grooves 68*a*, 68*b* on return spring 60. In this manner, slider 30 is biased to be maintained in a first position such that connectors 32 are exposed in openings 44 of guide 42 and aperture 38*a* of movable locking tab 38 may be is aligned with aperture 16*b* of stationary lock tab 16*a*. Cover 22 may be mounted on chassis 10 by inserting hooks 22*d* in openings 44, thus urging the spring biased slider connectors 32 to be displaced from the first position to a second position removed from openings 44. Upon sufficient movement of connectors 32, hooks 22*d* can snap into openings 33 of slider 30, spring 60 biases slider 30 toward bezel 24, and connectors 32 of slider 30 capture hooks 22*d* of cover 22 in openings 44 of chassis 10. In this position, stationary lock tab aperture 16*b* may be aligned with movable lock tab aperture 38*a* so that a locking device (not shown) may be inserted through the aligned apertures 16*b*, 38*a*, thus limiting reciprocal motion of slider 30 and removal of cover 22.

For removal of cover 22, the locking device mentioned above is removed. Pressure applied to button 55 at free end 52*b* of leaf spring 52 via opening 56 in bezel 24, causes extension 54 to extend through opening 61 and move return spring 60 which urges slider 30 from the first position to the second position as described above. Connecters 32 of slider 30 are thus moved a sufficient distance to permit hooks 22*d* of cover 22 to be released and removed from openings 44 in guide 42.

As it can be seen, the principal advantages of these embodiments are that they provide a sliding mechanism which has hooks for interlocking with mating hooks provided on a chassis cover. When the biased sliding mechanism is moved by a user, the interlocking hooks release and the cover can be removed. The sliding mechanism also has moving lock tab with an opening through which a locking device can be inserted, thus anchoring the sliding mechanism to a similar but stationary lock tab on the chassis for preventing unauthorized access to the computer chassis components. The sliding mechanism is biased to return to a locking position by a resilient device which may be a leaf spring attached to the chassis. The slider mechanism is constrained for one axis movement within a channel in the chassis. A one-button cover release feature is provided for displacement of the slider mechanism and release of the removable cover.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A slider device for a computer system comprising:

a chassis including an elongated channel guide having spaced apart openings provided therein;

a resilient release device movably mounted on the chassis; and a slider member movably mounted within the guide and having an engagement member on one end thereof connected to the resilient release device, the slider member having a plurality of spaced apart connectors thereon and movable therewith, the connectors positioned in the openings in the chassis in response to the slider member being in a first position, the connectors being shifted from the openings in response to the slider member being shifted to a second position, when the resilient release device is moved.

2. The slider device as defined in claims 1 wherein the connectors are equally spaced apart.

3. The slider device as defined in claim 1 wherein the slider member includes a locking tab on another end opposite the one end.

4. The slider device as defined in claim 1 wherein the resilient release device includes a spring.

5. The device as defined in claim 1 wherein the resilient release device maintains the slider member in the first position.

6. The slider device as defined in claim 1 wherein the slider member includes a locking tab having an aperture formed therethrough for receiving a locking device.

* * * * *

UNITED STATES PATENT AND TRADEMARK OFFICE

CERTIFICATE OF CORRECTION

PATENT NO. : 6,053,586
DATED : April 25, 2000
INVENTOR(S) : Stephen Cook et al.

It is certified that error appears in the above-identified patent and that said Letters Patent is hereby corrected as shown below:

Column 1,
Line 60, after "provides", delete -- an apparatus and method whereby --.

Column 3,
Line 53, after "be", delete -- is --.

Signed and Sealed this

Third Day of December, 2002

JAMES E. ROGAN
*Director of the United States Patent and Trademark Office*